(12) United States Patent
Diaconu

(10) Patent No.: US 7,753,671 B2
(45) Date of Patent: Jul. 13, 2010

(54) MECHANICAL FUSE ASSEMBLY OF MOLDING SYSTEM

(75) Inventor: Valentin Diaconu, Etobicoke (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 704 days.

(21) Appl. No.: 11/677,446

(22) Filed: Feb. 21, 2007

(65) Prior Publication Data

US 2008/0199559 A1 Aug. 21, 2008

(51) Int. Cl.
 *B29C 45/20* (2006.01)
(52) U.S. Cl. .............. 425/192 R; 425/190; 425/585; 425/587; 264/328.9; 264/328.15; 164/113; 164/312
(58) Field of Classification Search .......... 425/130, 425/190, 192 R, 549, 567, 569, 573, 574, 425/585, 589, 595, 568, 587, 151, DIG. 107, 425/DIG. 109; 264/328.9, 328.15; 164/312, 164/113
See application file for complete search history.

(56) References Cited

U.S. PATENT DOCUMENTS

| | | | |
|---|---|---|---|
| 3,934,626 A * | 1/1976 | Hall | 141/117 |
| 4,207,051 A * | 6/1980 | Wright et al. | 425/556 |
| 4,299,791 A * | 11/1981 | Aoki | 264/328.9 |
| 5,044,927 A * | 9/1991 | DiSimone et al. | 425/567 |
| RE35,256 E * | 5/1996 | von Buren et al. | 425/572 |
| 5,885,627 A * | 3/1999 | Hart | 425/385 |
| 5,910,327 A * | 6/1999 | Schad et al. | 425/572 |
| 5,922,266 A * | 7/1999 | Grove | 264/297.2 |
| 5,968,439 A * | 10/1999 | Grove | 264/297.2 |
| 5,983,978 A * | 11/1999 | Vining et al. | 164/312 |
| 6,059,012 A * | 5/2000 | Vining et al. | 164/312 |
| 6,276,916 B1 | 8/2001 | Schad et al. | |
| 6,296,044 B1 | 10/2001 | Brooks et al. | |
| 6,409,955 B1 * | 6/2002 | Schmitt et al. | 264/297.2 |
| 6,494,703 B2 | 12/2002 | Kestle et al. | |
| 6,520,762 B2 | 2/2003 | Kestle et al. | |
| 7,165,958 B2 * | 1/2007 | Jenko | 425/149 |
| 7,165,968 B2 * | 1/2007 | Serniuck | 425/557 |
| 7,284,979 B2 * | 10/2007 | Mai | 425/569 |
| 7,452,199 B2 * | 11/2008 | Eigler et al. | 425/190 |
| 7,559,756 B2 * | 7/2009 | Sicilia | 425/130 |
| 7,632,450 B2 * | 12/2009 | Jenko | 264/478 |
| 2002/0119213 A1 | 8/2002 | Kestle et al. | |
| 2002/0150646 A1 | 10/2002 | Kestle et al. | |
| 2004/0223403 A1 | 11/2004 | Schunk et al. | |
| 2005/0184434 A1 * | 8/2005 | Akopyan | 264/328.1 |
| 2005/0236740 A1 | 10/2005 | Niewels | |
| 2005/0255189 A1 | 11/2005 | Manda et al. | |
| 2006/0003046 A1 * | 1/2006 | Serniuck | 425/564 |
| 2006/0083814 A1 * | 4/2006 | Mai | 425/569 |
| 2006/0286197 A1 | 12/2006 | Manda et al. | |

* cited by examiner

*Primary Examiner*—Eric Hug
*Assistant Examiner*—Seyed Masoud Malekzadeh
(74) *Attorney, Agent, or Firm*—Husky Intellectual Property Services

(57) ABSTRACT

Disclosed, according to an aspect of the present invention, is a molding system that includes a mechanical fuse assembly configured to (i) abut a conduit connection, and (ii) permit movement of a conduit connection.

1 Claim, 10 Drawing Sheets ated to, molding systems, and more specifically the present invention relates to, but is not limited to, molding systems having a mechanical fuse assembly.

MECHANICAL FUSE ASSEMBLY OF MOLDING SYSTEM

TECHNICAL FIELD

The present invention generally relates to, but is not limited to, molding systems, and more specifically the present invention relates to, but is not limited to, molding systems having a mechanical fuse assembly.

BACKGROUND

Examples of known molding systems are (amongst others): (i) the HyPET (trademark) Molding System, (ii) the Quadloc (Trademark) Molding System, (iii) the Hylectric (trademark) Molding System, and (iv) the HyMET (trademark) Molding System, all manufactured by Husky Injection Molding Systems (Location: Canada; www.husky.ca).

U.S. Pat. No. 6,494,703 (Inventor: Kestle et al; Published: Dec. 17, 2002) discloses a barrel assembly for an injection molding machine, which includes a barrel coupler that prevents transmittance of an axial force from a nozzle side barrel portion to a rear side barrel portion. More specifically, this patent appears to disclose a barrel assembly that preferably has a first barrel coupler and a second barrel coupler. The first barrel coupler secures the barrel to a carriage. The second barrel coupler retains an end of the barrel in the carriage preventing rotation of the barrel during operation. The barrel section between the first barrel coupler and an end of the barrel is isolated from axial carriage force in operation.

U.S. Pat. No. 6,520,762 (Inventor: Kestle et al; Published: Feb. 18, 2003) discloses an injection unit for an injection molding machine that has a carriage coupler and a barrel coupler which couples a barrel assembly to a carriage which is mounted on an injection unit. More specifically, it appears that this patent discloses a barrel assembly and carriage assembly preferably having first complimentary couplers and second complimentary couplers. The first couplers interlock to secure the barrel assembly between the ends of the barrel assembly to a carriage assembly. The second couplers retain an end of the barrel assembly in the carriage assembly preventing rotation of the barrel assembly during operation.

United States Patent Application No. 2002/0119213 (Inventor: Kestle et al; Published: Aug. 29, 2002) discloses a barrel and carriage assembly for isolating a barrel from axial forces. In one aspect, the entire barrel is isolated from axial carriage force. In another aspect, a portion of the barrel is isolated from axial carriage force. In another aspect, a portion of the barrel is isolated from reactive injection force.

United States Patent Application No. 2002/0150646 (Inventor: Kestle et al; Publication: Oct. 17, 2002) discloses a carriage assembly having a first carriage coupler and a second carriage coupler. The first carriage coupler secures a barrel intermediate the ends of the barrel to the carriage. The second carriage coupler retains an end of the barrel in the carriage preventing rotation of the barrel during operation. A barrel alignment member in the carriage provides axial and vertical alignment of the barrel assembly in the carriage assembly during installation of the barrel in the carriage.

U.S. Pat. No. 6,276,916 (Inventor: Schad et al; Published: Aug. 21, 2001) discloses a failsafe device, or pressure relief mechanism, for a shooting pot actuator in an injection molding machine. The shooting pot actuator has a multiple pusher rods mounted on one, or more, plates. Moving the plate holding the pusher rods depresses the shooting pot injection pistons and injects molten material into a number of mold cavities. To avoid damage to the machine from the pusher rods if an injection piston seizes, a failsafe device is used to mount the pusher rods to the plates. A shearing member is interposed, or sandwiched, between first and second apertures. Typically, the shearing member is a plate that, in normal operating conditions, blocks rearward movement of the pusher rod. However, when a predetermined shear force is applied to the shear plate, the shearing member shears and the pusher rod retracts within the channel, thereby alleviating the pressure. The failsafe device can be paired with a seizure detection system, using a laser beam that detects piston and valve gate seizure, and provides appropriate notification or control signals.

United States Patent Application No. 2005/0255189 (Inventor: Manda et al; Published: Nov. 17, 2005) discloses a method and an apparatus for a molding melt conduit and/or a runner system that includes a coupling structure having a first surface configured to couple with a first melt conduit or manifold, and a second surface configured to couple with a second melt conduit or manifold. A cooling structure is configured to provide a coolant to the coupling structure. Preferably, the cooling structure cools the coupling structure to a temperature that causes any melt leaking from near the coupling structure to at least partially solidify thereby further sealing the connection(s).

United States Patent Application No. 2006/0286197A1 (Inventor: Manda et al; Published: Dec. 21, 2006) discloses an expansion bushing of a molding runner system that includes a body having a portion configured to cooperate with a melt conduit. The body seals against the melt conduit responsive to a thermal expansion of the body relative to the melt conduit. Preferably, an annular expansion bushing has a cylindrical outer surface configured to seal, upon application of heat to the bushing, with an inner cylindrical surface of the first melt conduit and an inner cylindrical surface of the second melt conduit. Also preferably, the annular expansion bushing has an inner cylindrical surface corresponding substantially to melt passageways of the first and second melt conduits.

SUMMARY

According to a first aspect of the present invention, there is provided a molding system, including a mechanical fuse assembly configured to (i) abut a conduit connection, and (ii) permit movement of a conduit connection.

According to a first aspect of the present invention, there is provided a molding system, including: (i) a mechanical fuse assembly; and (ii) a conduit connection, responsive to the conduit connection becoming cooled, the mechanical fuse assembly acts to permit movement of the conduit connection.

According to a first aspect of the present invention, there is provided a molding system, including a mechanical fuse assembly configured to be placed between: (i) an injection housing of an extruder, and (ii) a barrel assembly of the extruder, the barrel assembly supported by the injection housing, the mechanical fuse assembly configured to permit movement of the barrel assembly.

According to a first aspect of the present invention, there is provided a molding system, having an extruder including: (i) a injection housing; (ii) a barrel assembly supported by the injection housing; and (iii) a mechanical fuse assembly configured to be placed between the injection housing and the barrel assembly, the mechanical fuse assembly configured to permit movement of a conduit connection.

According to a first aspect of the present invention, there is provided a molding system, including an extruder having: a hopper being configured to receive a flowable molding material; a feed throat being coupled to the hopper, the feed throat receiving, in use, the flowable molding material from the hopper; a conduit assembly including: (i) a first conduit interacting with the feed throat, and receiving, in use, the flowable molding material from the feed throat, and (ii) a second conduit being coupled to the first conduit; a screw being received in the first conduit; a screw actuator being coupled to the screw, and the screw actuator, in use, when so made to cooperate with the screw to: convert the flowable molding material received in the first conduit into an injectable molding material, and push the injectable molding material from the first conduit to the second conduit; and a machine nozzle coupled to the second conduit; a clamp assembly, including: a stationary platen configured to support a stationary mold portion of a mold assembly, the stationary mold portion configured to receive the injectable molding material from a hot runner, the hot runner configured to be coupled to the machine nozzle and also configured to receive the injectable molding material from the machine nozzle; a movable platen configured to: support a movable mold portion of the mold assembly, the movable mold portion being movable relative to the stationary mold portion, the stationary mold portion and the movable mold portion defining a mold cavity once the movable mold portion abuts against the stationary mold portion, the mold cavity being fillable with the injectable molding material to be received from the machine nozzle, under pressure from the second conduit, once the screw has been actuated to inject the injectable molding material; move relative to the stationary platen so as to close the movable mold portion against the stationary mold portion; a mold stroke actuator coupled to the movable platen, and configured to stroke the movable platen; tie bars attached to respective corners of the stationary platen, the tie bars being interactable with respective corners of the movable platen; a lock configured to lockably engage the movable platen with the tie bars; and a clamp actuator configured to impart a clamping force, in effect, to the stationary platen and the movable platen once the movable mold portion is closed against the stationary mold portion and the movable platen is locked to the tie bars; and a mechanical fuse assembly configured to be placed next to the conduit assembly, the mechanical fuse assembly configured to permit movement of the conduit assembly.

According to a first aspect of the present invention, there is provided a molding system, including an extruder having: a hopper configured to receive a flowable molding material; a feed throat being coupled to the hopper, the feed throat receiving, in use, the flowable molding material from the hopper; a conduit assembly including: (i) a first conduit being coupled to the feed throat, and configured to receive the flowable molding material from the feed throat, and (ii) a second conduit being coupled to the first conduit; a screw received in the first conduit; a screw actuator coupled to the screw, the screw actuator being configured to, in cooperation with the screw: (i) convert the flowable molding material received in the first conduit into an injectable molding material, and (ii) push the injectable molding material from the first conduit to the second conduit; and a machine nozzle coupled to the second conduit; a clamp assembly, including: a stationary platen configured to support a stationary mold portion, the stationary mold portion configured to be coupled to the machine nozzle, and also configured to receive the injectable molding material from the machine nozzle; a movable platen configured to: support a movable mold portion of a mold assembly, the movable mold portion being movable relative to the stationary mold portion, the stationary mold portion and the movable mold portion defining a mold cavity once the movable mold portion abuts against the stationary mold portion, the mold cavity being fillable with the injectable molding material to be received from the machine nozzle, under pressure from the second conduit, once the screw has been actuated to inject the injectable molding material; and move relative to the stationary platen so as to close the movable mold portion against the stationary mold portion; a mold stroke actuator coupled to the movable platen, and configured to stroke the movable platen; tie bars attached to respective corners of the stationary platen, the tie bars being interactable with respective corners of the movable platen; a lock configured to lockably engage the movable platen with the tie bars; and a clamp actuator configured to impart a clamping force, in effect, to the stationary platen and the movable platen once the movable mold portion is closed against the stationary mold portion and the movable platen is locked to the tie bars; and a mechanical fuse assembly configured to be placed next to the conduit assembly, the mechanical fuse assembly configured to permit movement of the conduit assembly.

According to a first aspect of the present invention, there is provided a molding system, having: an extruder including: a hopper configured to receive a flowable molding material; a feed throat being coupled to the hopper, the feed throat receiving, in use, the flowable molding material from the hopper; a conduit assembly including: a first conduit interacting with the feed throat, and configured to receive the flowable molding material from the feed throat; and a second conduit coupled to the first conduit; a screw received in the first conduit; a screw actuator coupled to the screw, the screw actuator, in use when so made to cooperate with the screw, to: (i) convert the flowable molding material received in the first conduit into an injectable molding material, and (ii) push the injectable molding material from the first conduit to the second conduit; and a machine nozzle coupled to the second conduit; and a mechanical fuse assembly configured to be placed next to the conduit assembly, the mechanical fuse assembly configured to permit movement of the conduit assembly.

According to a first aspect of the present invention, there is provided a molding system, having: a hot runner including: a conduit assembly including: a first conduit being configured to: (a) be interactable with a machine nozzle of a molding system, and (b) receive, in use, an injectable molding material from the machine nozzle; and a second conduit being configured to: (a) be coupled to the first conduit, (b) be coupled to a stationary mold portion of a mold assembly, and (c) convey, in use, the injectable molding material from the first conduit to a mold cavity defined by the mold assembly; and a mechanical fuse assembly configured to be placed next to the conduit assembly, the mechanical fuse assembly configured to permit movement of the conduit assembly.

A technical feature of the exemplary embodiments is improved operation of the molding system.

DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
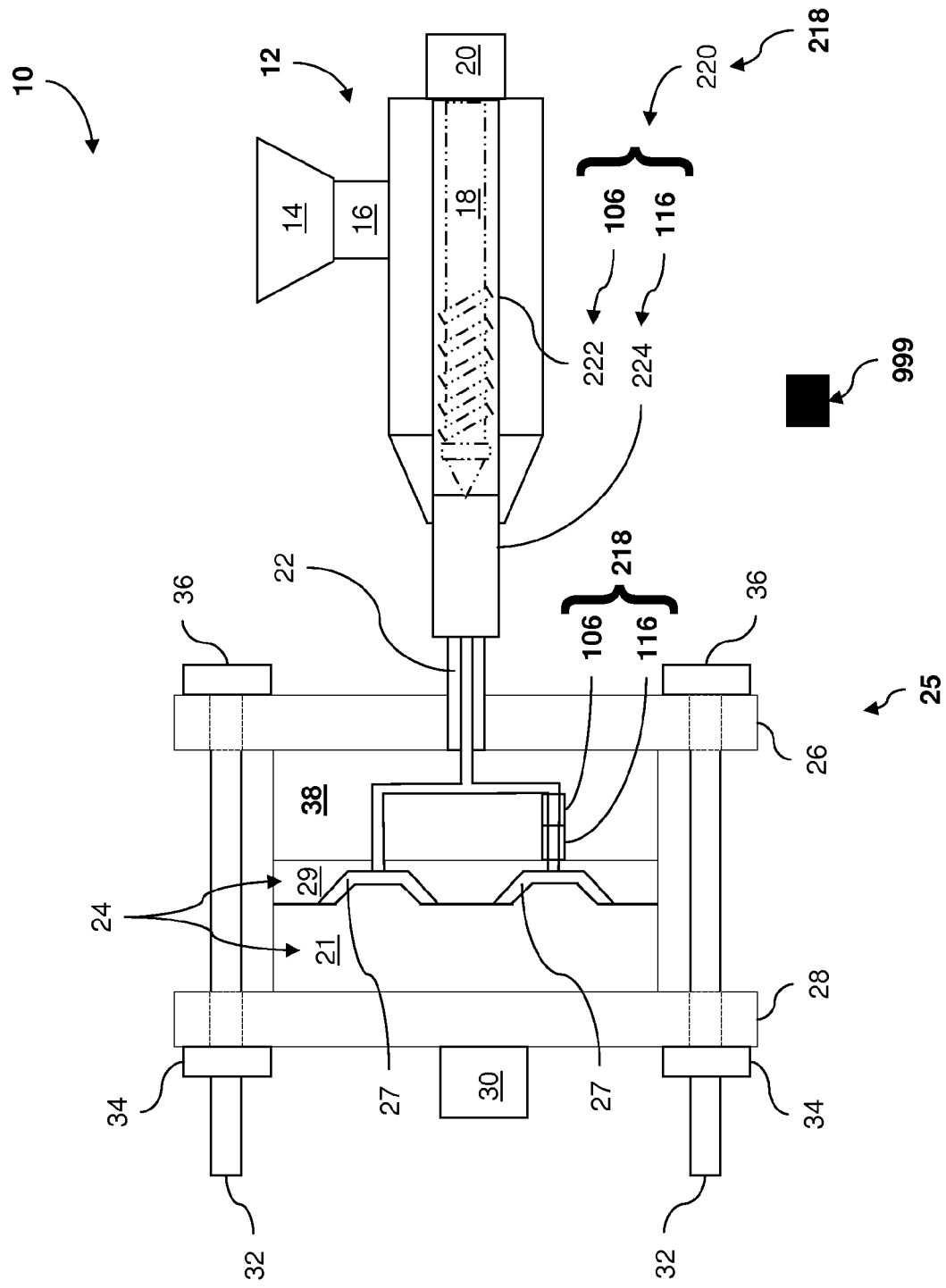
FIG. 1 depicts a schematic representation of a molding system 10 according to the first exemplary embodiment, the second exemplary embodiment, the third exemplary embodiment, and the fourth exemplary embodiment.

FIG. 1 depicts the schematic representation of a molding system 10 (preferably, an injection metal molding system, which is hereafter referred to as the "system 10") according to the first exemplary embodiment, the second exemplary embodiment, the third exemplary embodiment, and the fourth exemplary embodiment. The molding system 10 includes components that are known to persons skilled in the art and these known components will not be described here; these known components are described, at least in part, in the following text books (by way of example): (i) *Injection Molding Handbook* by Osswald/Turng/Gramann (ISBN: 3-446-21669-2; publisher: Hanser), and (ii) *Injection Molding Handbook* by Rosato and Rosato (ISBN: 0-412-99381-3; publisher: Chapman & Hill). The system 10 is, preferably, configured to process a metal molding material, such as an alloy of magnesium (preferably in a thixotropic state, otherwise known as a slurry state, or in a liquidus state), an alloy of aluminum, an alloy of zinc, etc. A molded article 999 is manufactured by usage of the system 10.

Figure 2:
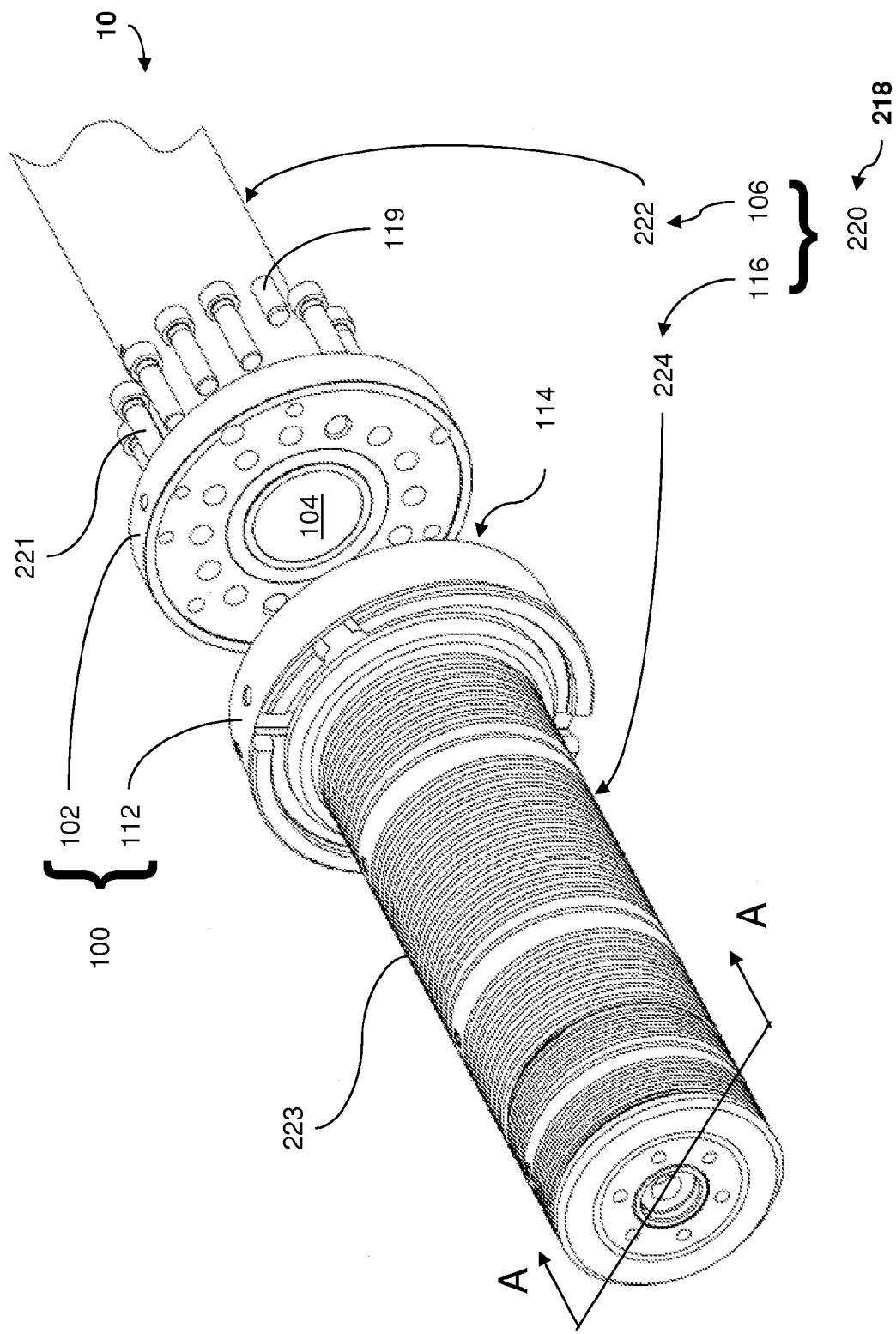
FIG. 2 depicts a perspective view of the molding system 10 of FIG. 1 according to the fifth exemplary embodiment and the sixth exemplary embodiment.

According to the first exemplary embodiment, the system 10 includes: an extruder 12, a clamp assembly 25, and a conduit connection 100 (of which an example is depicted in FIG. 2). The extruder 12 may be (by way of example): (i) a reciprocating-screw (RS) extruder, or (ii) a two-stage extruder that has a shooting pot configuration. The extruder 12 has: (i) a hopper 14, (ii) a feed throat 16, (iii) a conduit assembly 218, (iv) a screw 18, (v) a screw actuator 20, and (vi) a machine nozzle 22. The hopper 14 is configured to receive a flowable molding material. The feed throat 16 is coupled to the hopper 14. The feed throat 16 receives, in use, the flowable molding material from the hopper 14. The conduit assembly 218 includes: (a) a first conduit 106, and (b) a second conduit 116. The first conduit 106 interacts with the feed throat 16, and receives, in use, the flowable molding material from the feed throat 16. The second conduit 116 is coupled to the first conduit 106. The screw 18 is received in the first conduit 106. The screw actuator 20 is coupled to the screw 18, and the screw actuator 20, in use when so made to cooperate with the screw 18, performs the following functions: (i) convert the flowable molding material received in the first conduit 106 into an injectable molding material, and (ii) push the injectable molding material from the first conduit 106 to the second conduit 116. The machine nozzle 22 is coupled to the second conduit 116. The clamp assembly 25 includes: (i) a stationary platen 26, (ii) a movable platen 28, (iii) a mold stroke actuator 30, (iv) tie bars 32, (iv) a lock 34, and (iv) a clamp actuator 36. The stationary platen 26 is configured to support a stationary mold portion 29 of a mold assembly 24. The stationary mold portion 29 is configured to receive the injectable molding material from a hot runner 38. The hot runner 38 is configured to be coupled to the machine nozzle 22 and is also configured to receive the injectable molding material from the machine nozzle 22. The movable platen 28 is configured to: (a) support a movable mold portion 21 of the mold assembly 24, and (b) move relative to the stationary platen 26 so as to close the movable mold portion 21 against the stationary mold portion 29. The movable mold portion 21 is movable relative to the stationary mold portion 29. The stationary mold portion 29 and the movable mold portion 21 define, in combination, a mold cavity 27 once the movable mold portion 21 abuts against the stationary mold portion 29. The mold cavity 27 is fillable with the injectable molding material to be received from the machine nozzle 22 (via the hot runner 38), under pressure from the second conduit 116, once the screw 18 has been actuated to inject the injectable molding material. The mold stroke actuator 30 is coupled to the movable platen 28, and is configured to stroke the movable platen 28. The tie bars 32 are attached to respective corners of the stationary platen 26. The tie bars 32 are interactable with respective corners of the movable platen 28. The lock 34 is configured to lockably engage the movable platen 28 with the tie bars 32. The clamp actuator 36 is configured to impart a clamping force, in effect, to the stationary platen 26 and the movable platen 28 once: (i) the movable mold portion 21 is closed against the stationary mold portion 29, and (ii) the movable platen 28 is locked to the tie bars 32.

With reference to FIG. 2, the conduit connection 100 includes: (i) a first flange 102, and (ii) a second flange 112. The first flange 102 is coupled to a first port 104 (such as an exit port) of the first conduit 106 of a conduit assembly 218. The second flange 112 is coupled to a second port 114 (such as an input port) of the second conduit 116 of the conduit assembly 218. The second flange 112 is sealably engaged with the first flange 102. The second port 114 is aligned with the port 104 so that the injectable molding material may flow from the first conduit 106 to the second conduit 116. It will be appreciated that the mold assembly 24 and the hot runner 38 are typically sold separately from the extruder 12 and the clamp assembly 25. The mold assembly 24 wears over time and as such it is replaced as may be required. The hot runner 38 is usually matched to meet the requirements of the mold assembly 24, and as such is typically not usable with another mold assembly (not depicted) having a different configuration. According to a preferred implementation, the first conduit 106 includes a low pressure section 222 of a barrel assembly 220, the second conduit 116 includes a high pressure section 224 of the barrel assembly 220, and the conduit assembly 218 includes the barrel assembly 220. The low pressure section 222 is the part of the barrel assembly 220 in which pellets of molding material (received from the hopper 14) are processed into the injectable moldable molding material, and the high pressure section 224 is the part of the barrel assembly 220 in which the injectable molding material is accumulated and then injected or pushed, under pressure, to the mold cavity 27 (or cavities) of the mold assembly 24 via the machine nozzle 22 and hot runner 38.

According to the second exemplary embodiment (not depicted), the mold assembly 24 includes a single mold cavity (not depicted); in this case, the system 10 does not use (or include) the hot runner 38, and the system 10 is arranged so that: (i) the machine nozzle 22 is coupled to the second conduit 116, (ii) the stationary mold portion 29 is coupled to the machine nozzle 22, and receives, in use, the injectable molding material from the machine nozzle 22, (iii) the mold cavity 27 is fillable with the injectable molding material to be received from the machine nozzle 22, under pressure from the second conduit 116, once the screw 18 has been actuated to inject (or push) the injectable molding material.

According to the third exemplary embodiment, the system 10 includes only the extruder 12, and does not include the clamp assembly 25.

According to the fourth exemplary embodiment, the system 10 includes the hot runner 38, and does not include the extruder 12 and the clamp assembly 25. The hot runner 38 includes: (i) the conduit assembly 218, and the conduit connection 100. The conduit assembly 218 includes: (i) a first conduit 106, and (ii) a second conduit 116. The first conduit 106 is configured to: (a) be interactable with a machine nozzle 22, and (b) receive, in use, an injectable molding material from the machine nozzle 22. The second conduit 116 is configured to: (a) be coupled to the first conduit 106, (b) be coupled to a stationary mold portion 29 of a mold assembly 24, (c) convey, in use, the injectable molding material from the first conduit 106 to a mold cavity 27 defined by a mold assembly 24. The conduit connection 100 includes: (i) a first flange 102, and (ii) a second flange 112. The first flange 102 is coupled to the port 104 of the first conduit 106 of the conduit assembly 218. The second flange 112 is coupled to the second port 114 of the second conduit 116 of the conduit assembly 218. The second flange 112 is sealably engaged with the first flange 102. The second port 114 is aligned with the port 104 so that an injectable molding material may flow from the first conduit 106 to the second conduit 116.

FIG. 2 depicts the perspective view of the system 10 of FIG. 1 according to the fifth exemplary embodiment and the sixth exemplary embodiment. According to the fifth exemplary embodiment, the molding system 10 includes the conduit assembly 218, but does not include the extruder 12, the clamp assembly 25 and the hot runner 38 (that is, the conduit assembly 218 is sold separately).

The conduit assembly 218, preferably, includes the barrel assembly 220; specifically, the conduit assembly 218 includes: (i) the first conduit 106, (ii) the second conduit 116, and (iii) the conduit connection 100. Preferably, the first conduit 106 includes the low pressure section 222 of the barrel assembly 220 of the extruder 12. The low pressure section 222 is coupled to the feed throat 16 of the extruder 12. The low pressure section 222 is configured to receive, in use, a flowable molding material from the feed throat 16. The second conduit 116 includes a high pressure section 224 of the barrel assembly 220. The high pressure section 224 is coupled to the low pressure section 222. Alternatively, the conduit assembly 218 is used in the hot runner 38.

According to the sixth exemplary embodiment, the system 10 includes the conduit connection 100 but does not include the conduit assembly 218, the extruder 12, the hot runner 38, and the clamp assembly 25 (that is, the conduit connection 100 is sold separately). Optionally, the first flange 102 is coupled to the second flange 112 via the bolts 221. The first conduit 106 is configured to be a low pressure section 222, and the second conduit 116 is configured to be a high pressure section 224, the high pressure section 224 defines a heater groove 223 (hereafter referred to as the "groove 223") that receives a heater wire (not depicted in FIG. 2). An alignment dowel 119 (hereafter referred to as the "dowel 119") is used to align the first flange 102 with the second flange 112. Preferably, two dowels 119 are used on opposite sides of the flanges 102, 112 (a single dowel 119 is depicted in FIG. 2).

Figure 3:
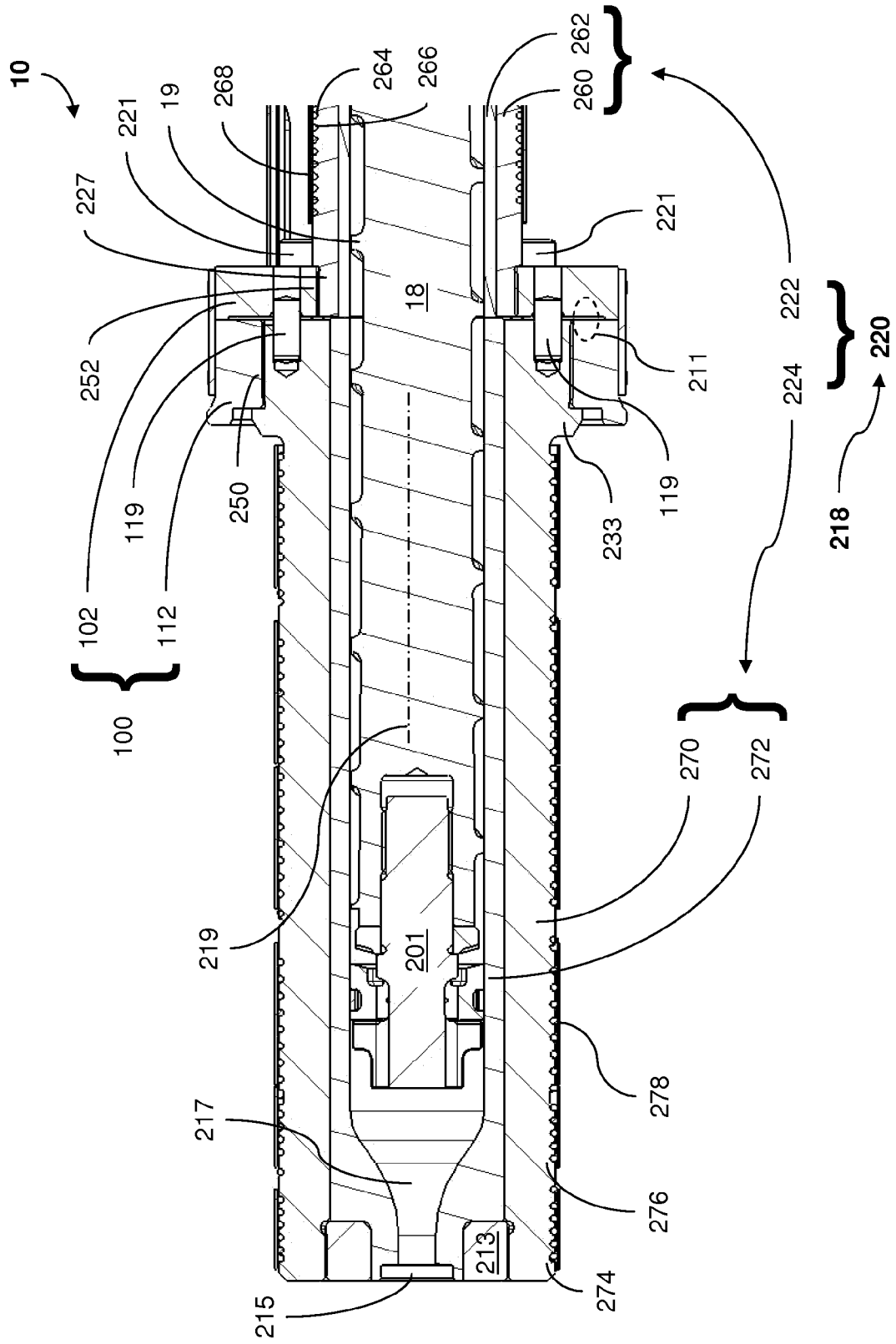
FIG. 3 depicts a cross sectional view of the molding system 10 of FIG. 1 according to the seventh exemplary embodiment.

FIG. 3 depicts the cross sectional view of the system 10 of FIG. 1 according to the seventh exemplary embodiment. The cross sectional view is taken along a section line A-A that is shown in FIG. 2; the section line A-A: (i) extends along a longitudinal axis 219 of the barrel assembly 220, and (ii) passes through the dowels 119. The first flange 102 defines passageways that are sized to receive respective dowels 119 on opposite sides of the first flange 102. The high pressure section 224 includes a second shell 270 that defines channels that are located on opposite sides of the second shell 270, and these channels are sized to receive respective dowels 119. The dowels 119 extend into the second shell 270 and extend into the first flange 102 so that the first flange 102 cannot be rotated relative to the high pressure section 224. The second flange 112 defines a centrally-aligned passageway (that extends through the second flange 112) that is sized smaller than a centrally-aligned passageway defined by the first flange 102. The first flange 102 threadably engages, via threads 252, the first conduit 106. The second flange 112 threadably engages, via threads 250, the second conduit 116. The screw 18 is depicted positioned in an end of an injection cycle of the system 10 in which a shot was injected into the mold cavity 27 of the mold assembly 24. The screw 18 includes a screw flight 19 that extends from the outer periphery of the screw 18 toward the inner diameter of the low pressure section 222. The high pressure section 224 and the low pressure section 222 are aligned along the longitudinal axis 219. The high pressure section 224 defines: (i) an accumulation zone 217, and (ii) an exit port 215 that leads from the accumulation zone 217 to the machine nozzle 22. The high pressure section 224 is configured to securely receive a support cap 213. The support cap 213 is threadably secured to the high pressure section 224. The machine nozzle 22 (not depicted in FIG. 3) is to be mounted to the support cap 213.

At a distal end of the high pressure section 224, a shoulder 233 extends from the outer diameter of the high pressure section 224 so that the second flange 112 may abut against the shoulder 233. At a distal end of the low pressure section 222, the low pressure section 222 defines a spigot 227 that extends from the distal end of the low pressure section 222. The first flange 102 defines a passageway that extends through the first flange 102, and the passageway has an inner diameter that is sized to receive the passageway of the low pressure section 222. At room temperature, the first flange 102 and the second flange 112 define a gap 211 therebetween, once the flanges 102, 112 are made to abuttably contact each other at least in part. More specifically, the flanges 102, 112 contact each other at peripheral edges of the flanges 102, 112 at room temperature. If the flanges 102, 112 are bolted together, they are bolted at 50% of rated torque of the bolts 221 so that the flanges 102, 112 may substantially touch each other at an operational temperature of the barrel assembly 220, which is approximately 620 degrees Centigrade if the system 10 is being used to mold a magnesium alloy. The gap 211 is, preferably, 1 millimeter (hereafter referred to as "mm") at room temperature, but the gap 211 becomes substantially zero (0) mm at the operating temperature of the barrel assembly 220 so that flanges 102, 112 substantially touch each other (thereby substantially eliminating the gap 211). At room temp, the bolts 221 help to keep the flanges 102, 112 together;

at operating temperature (such as, at approximately 620 degrees Centigrade), thermal loading keeps the flanges 102, 112 together. The thermal loading arrangement is depicted and described in detail in association with FIG. 6. A valve 201 (which is also known as a check valve) is connected to the distal end of the screw 18. The function and the structure of the valve 201 are well known, and as such the valve 201 will not be described here in detail. A function of the valve 201 is to prevent leaking of the injectable molding material back over the screw flight 19 of the screw 18 during injection of a shot of the injectable molding material into the mold cavity 27. The valve 201 may be a cylindrical plate or a spherical member or a conical member. The valve 201 is disclosed, for example, in U.S. Pat. No. 2,885,734 (Inventor: Wucher; Published: 12 May 1959).

Preferably, the low pressure section 222 includes: (i) a first shell 260, and (ii) a first liner 262 that is received in the first shell 260. If the system 10 is used to mold a metallic alloy of magnesium, the first shell 260 is made substantially of Inconel alloy 718 (Supplier: Special Metals Corporation, Huntington, W. Va., USA; http://www.specialmetals.com), and the first liner 262 is made substantially of Stellite (trademark), and the first liner 262 is shrink fitted with the first shell 260. The low pressure section 222 includes: (i) an outer surface that defines a heater groove 264, (ii) a heater wire 266 that is received in the heater groove 264, and (iii) a heater band 268 that that surrounds the heater wire 266. The heater band 268 is configured to maintain the heater wire 266 in substantial contact with the heater groove 264.

The high pressure section 224 includes: (i) the second shell 270, and (ii) a second liner 272 that is received in the second shell 270. If the system 10 is used to mold a metallic alloy of magnesium, the second shell 270 is made substantially of Inconel alloy 718, and the second liner 272 is made substantially of Stellite (trademark) (Vendor: Stellite Coatings, 1201 Eisenhower Drive N., Goshen, Ind. 46526 USA; www.stellite.com) that is received in the second shell 270, and the second liner 272 is shrink fitted to the second shell 270. The high pressure section 224 includes: (i) an outer surface defining a heater groove 274, (ii) a heater wire 276 that is received in the heater groove 274, and (iii) a heater band 278 that surrounds the heater wire 276. The heater band 278 is configured to maintain the heater wire 276 in substantial contact with the heater groove 274.

Figure 4:
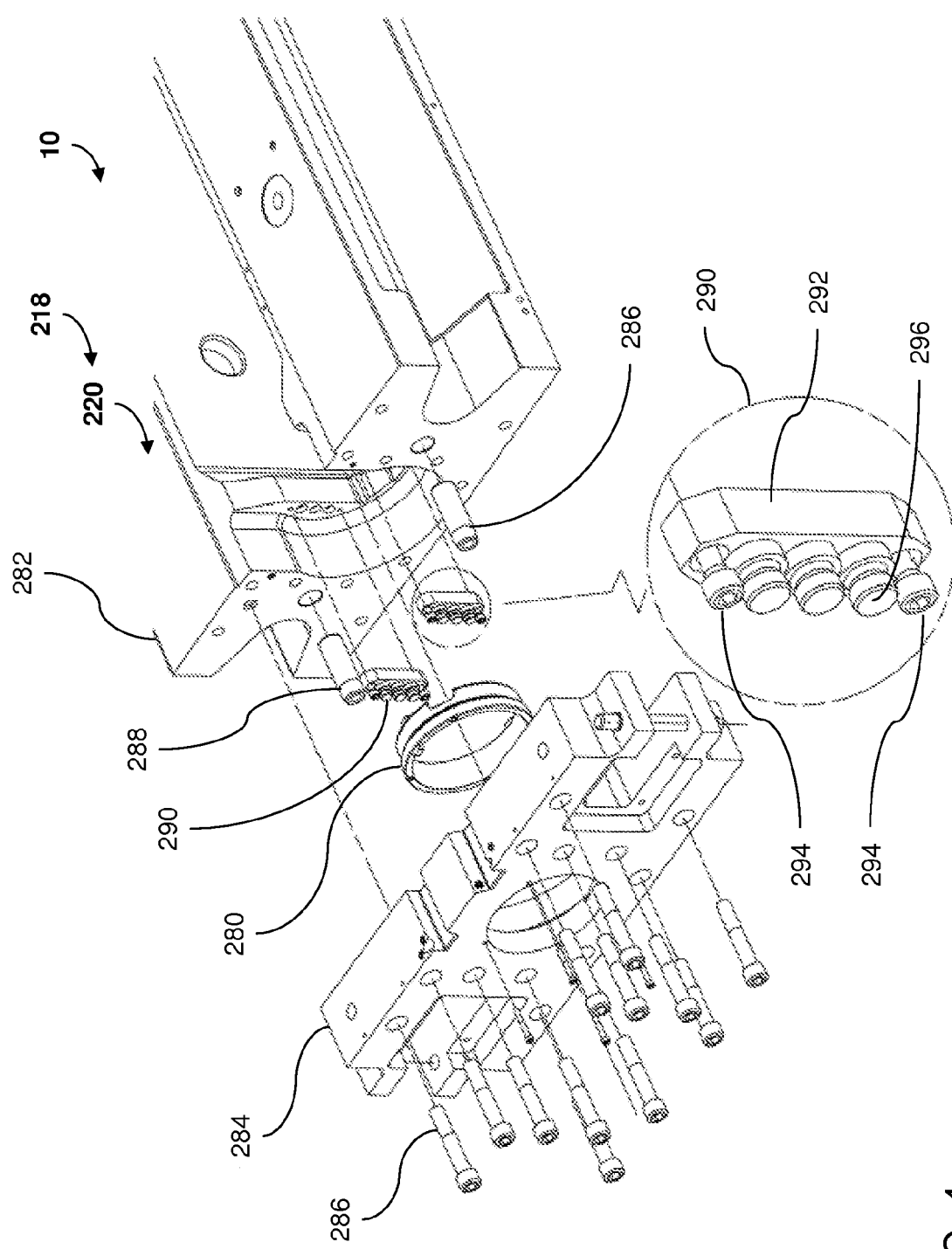
FIG. 4 depicts an exploded perspective view of the molding system 10 of FIG. 1 according to an eighth exemplary embodiment.

FIG. 4 depicts the exploded perspective view of the system 10 of FIG. 1 according to the eighth exemplary embodiment. Specifically, FIG. 4 depicts additional details associated with the conduit assembly 218 and the barrel assembly 220. Preferably, the barrel assembly 220 includes: (i) a load ring 280, (ii) an injection housing 282, (iii) a yoke 284, (iv) a yoke locating pin 288, and (v) a mechanical fuse assembly 290. The load ring 280 abuts the second flange 112 of the high pressure section 224. The injection housing 282 supports, at least in part, the low pressure section 222. The yoke 284 supports, at least in part, the high pressure section 224, The yoke 284 is attached to the injection housing 282 via bolts 286. The yoke locating pin 288 interacts with the yoke 284 and the injection housing 282 so as to align the yoke 284 with the injection housing 282. The mechanical fuse assembly 290 is coupled to the injection housing 282. The mechanical fuse assembly 290 is also coupled to the first flange 102 of the low pressure section 222. The mechanical fuse assembly 290 includes: (i) a base unit 292, and a fuse element 296. The base unit 292 is coupled to the injection housing 282 via bolts 294. The fuse element 296 is interactable with the base unit 292. According to variants, the following may be considered for other embodiments (which are not depicted): (i) the mechanical fuse assembly 290 is coupled to the first flange 102, and/or (ii) the mechanical fuse assembly 290 is coupled to the second flange 112. The mechanical fuse assembly 290 includes: (i) a base unit 292, and (ii) a fuse element 296 that is interactable with the base unit 292.

Figure 5:
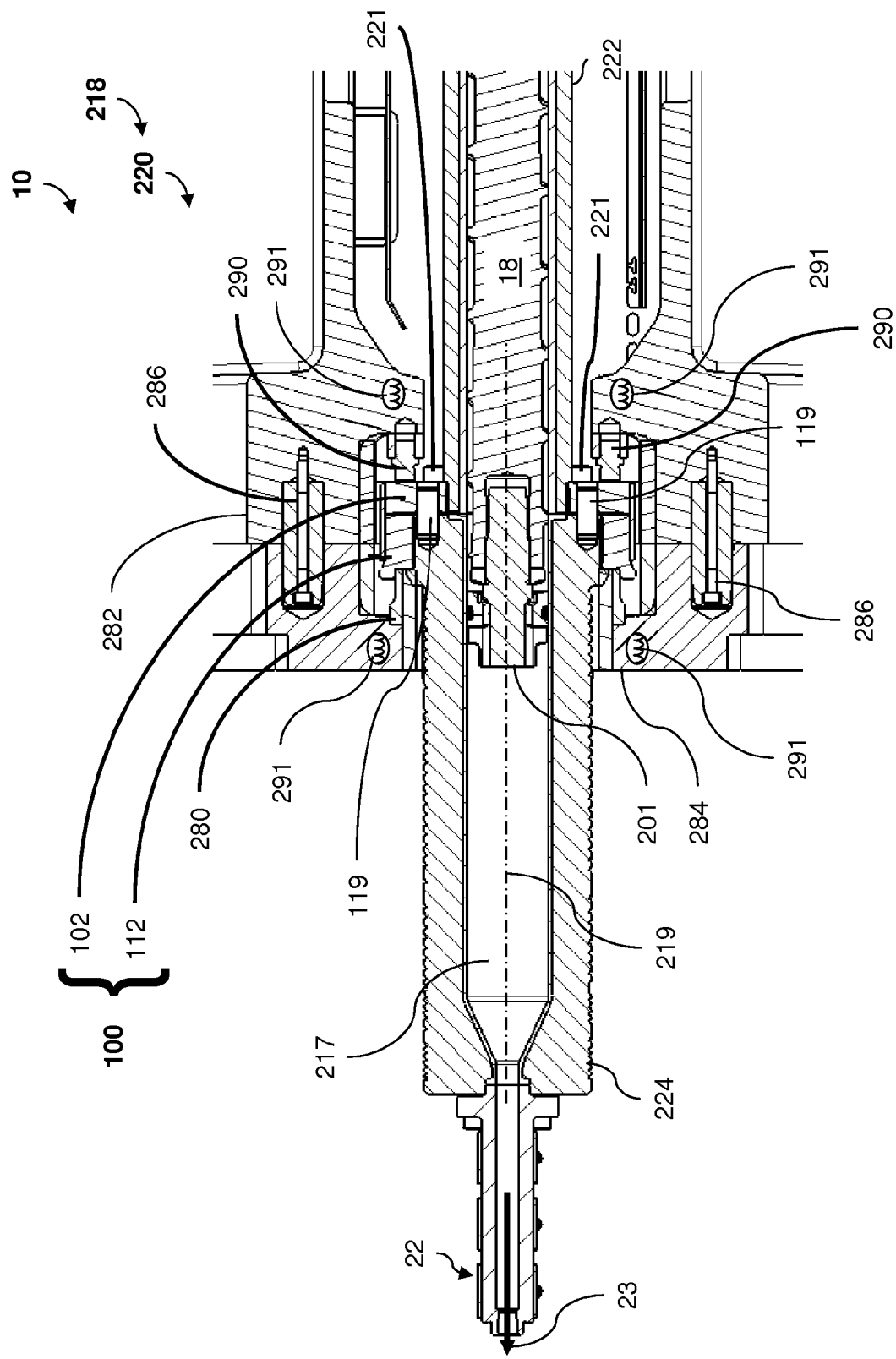
FIG. 5 depicts a cross sectional view of the molding system 10 of FIG. 1 according to the eighth exemplary embodiment.

FIG. 5 depicts the cross sectional view of the system 10 of FIG. 1 according to the eighth exemplary embodiment. Specifically, FIG. 5 depicts the conduit assembly 218 and the barrel assembly 220. No loading forces are made to interact with the parts of the barrel assembly 220. An injection path 23 is the path that the injectable molding material will travel along. The mechanical fuse assembly 290 is aligned parallel to and offset from the longitudinal axis 219 of the low pressure section 222. The injection housing 282 defines cooling circuits 291, and the yoke 284 defines cooling circuits 291. The purpose of the cooling circuits 291 will be explained in the description associated with FIG. 6. The cooling circuits 291 are positioned proximate to the load ring 280 and proximate to the injection housing 282 (next to the mechanical fuse assembly 290).

Figure 6:
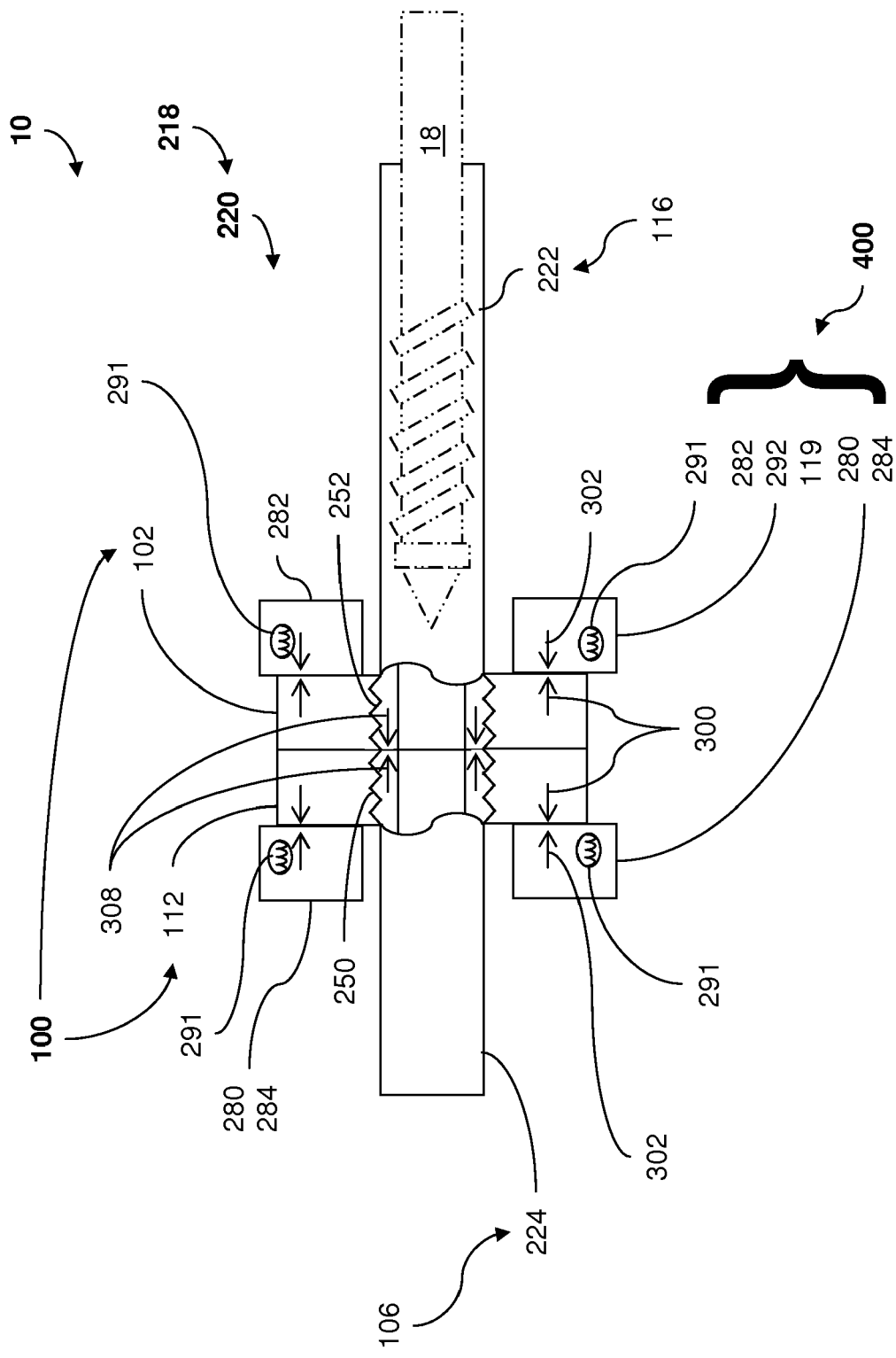
FIG. 6 depicts a schematic representation of the molding system 10 according to the seventh exemplary embodiment.

FIG. 6 depicts the schematic representation of the system 10 according to the seventh exemplary embodiment. According to the seventh exemplary embodiment, the system 10 includes: (i) a conduit clamp 400, and (ii) the conduit connection 100. According to a variant, the conduit clamp 400 and the conduit connection 100 are sold separately. Preferably, the conduit clamp 400 includes the combination of: (i) the cooling circuits 291, (ii) the load ring 280, (iii) the yoke 284, (iv) the injection housing 282, (v) the mechanical fuse assembly 290, and (iv) the dowel 119. The yoke 284 is made of stainless steel. The injection housing 282 is made of cast iron. The first flange 102, the second flange 112, the dowel 119, and the mechanical fuse assembly 290 (components thereof) are made of Inconel alloy 718 because these components are located proximate to the barrel assembly 220. The cooling circuits 291 are used for thermal management of the injection housing 282, the yokes 284 and the load ring 280. The conduit clamp 400 includes, preferably, the cooling circuit 291 that is configured to maintain the conduit clamp 400 at the relatively low temperature. The cooling circuit 291 carries a coolant (such as water) that is used to keep the conduit clamp 400 cooled and therefore in a rigid state. The conduit connection 100 is operated at an operating temperature that is relatively higher than that of the conduit clamp 400. The conduit connection 100 is retained in the conduit clamp 400. The conduit connection 100 includes: (i) the first flange 102 and (ii) the second flange 112. The conduit clamp 400 is configured to maintain the first flange 102 and the second flange 112 substantially sealed against each other so that the injectable molding material may flow from the first conduit 106 to the second conduit 116 without substantially leaking from the conduit connection 100. FIG. 6 depicts the first conduit 106 embodied as the high pressure section 224, and depicts the second conduit 116 embodied as the low pressure section 222. The conduit connection 100 becomes heated as a result of heat contained in the injectable molding material that is contained in the conduit assembly 218. Responsive to the conduit connection 100 being heated to operating temperature, the conduit connection 100 expands and imposes a thermal expansion force 300 to the conduit clamp 400. The conduit clamp 400 responds by acting to constrain thermal expansion of the conduit connection 100 because the conduit clamp 400 is maintained at a relatively lower temperature and an in this manner, the conduit clamp 400 imposes a clamping force 302 that counteracts the thermal expansion force 300. A sealing force 308 is imposed at the inner peripheral edge of the first conduit 106 and the second conduit 116. The sealing force 308 is merely the effect created as a result of thermal expansion of the conduit connection 100.

The first flange 102 is, preferably, coupled to the second flange 112 via thermal loading. According to the embodiment depicted in FIG. 2, the flanges 102, 112 are bolted together at 50% of rated torque of the bolts 221 so that the gap 211 (depicted in FIG. 3), which exists at room temperature, disappears (preferably) and this manner the first flange 102 and the second flange 112 touch each other at the operating temperature of the barrel assembly 220. It is preferred to use the combination of: (i) the bolts 221, and (ii) the thermal load (that is, the effect achieved by the conduit clamp 400) to maintain the flanges 102, 112 sealed against each other. However, according to a variant, (i) the flanges 102, 112 are assembled without using the bolts 221, and (ii) the flanges 102, 112 thermally expand against the conduit clamp 400 as the conduit clamp 400 is kept at a relatively lower temperature (so that the conduit clamp 400 may constrain the flanges 102, 112 against each other) in response to the barrel assembly 220 becoming heated to the operating temperature of the barrel assembly 220. The barrel assembly 220, when used in a metal injection molding system (such as for injecting a molten alloy of magnesium), will reach temperatures of over 600 degrees Centigrade. In this arrangement, thermal loading maintains the flanges 102, 112 in a sealing arrangement relative to each other. The thermal expansion force 300 is associated with the flanges 102, 112. The thermal expansion force 300 is equal to an opposite in direction to the clamping force 302 so that in this manner, the flanges 102, 112 remain static so as to maintain the seal between the flanges 102, 112.

Figure 7:
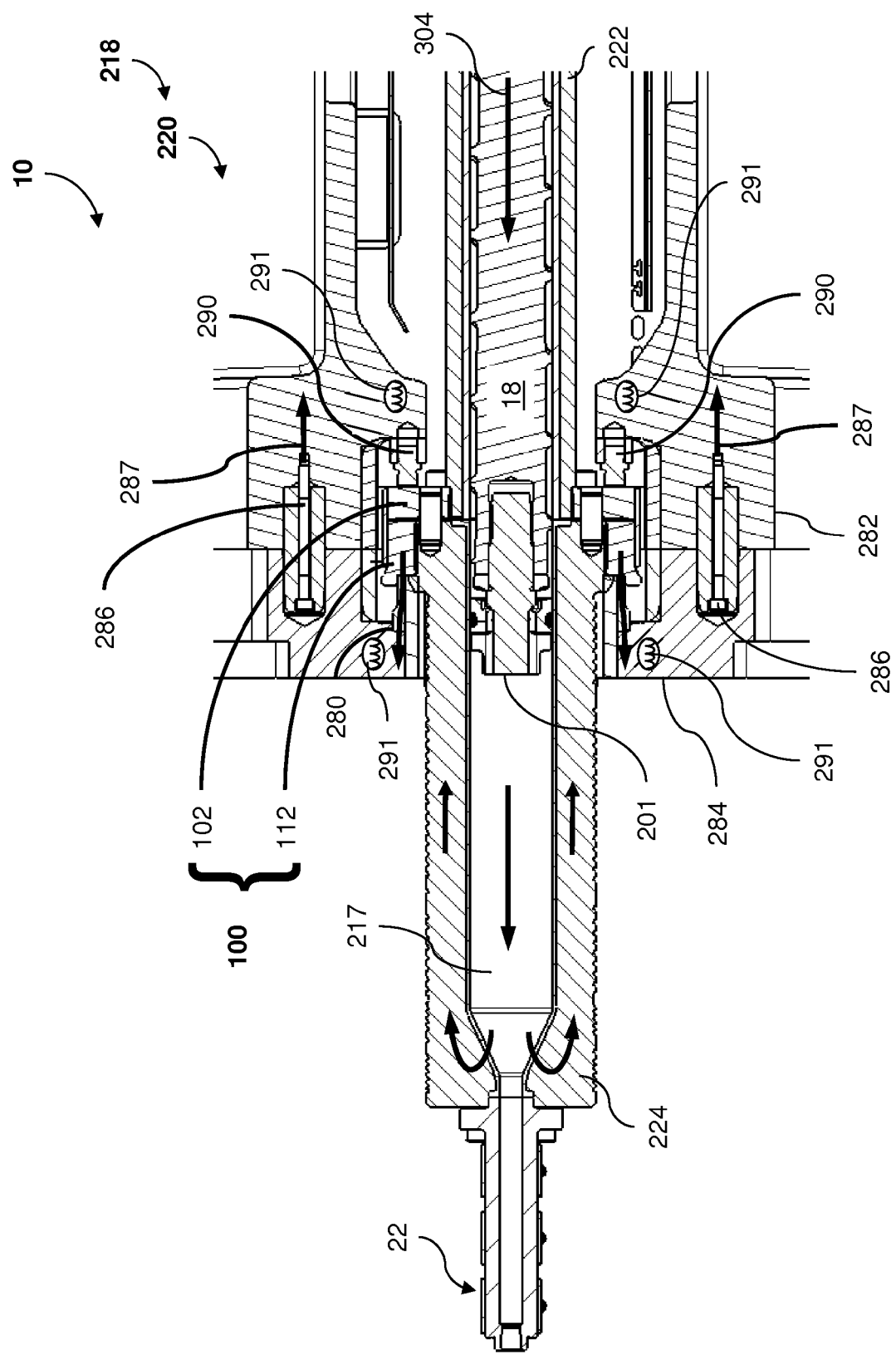
FIG. 7 depicts a cross sectional view of the molding system 10 of FIG. 1 according to the eighth exemplary embodiment.

FIG. 7 depicts the cross sectional view of the system 10 of FIG. 1 according to the eighth exemplary embodiment. Specifically depicted is a cross sectional view of the barrel assembly 220. The position of the screw 18 is in a beginning of an injection cycle of the system 10 before a shot is injected from the accumulation zone 217 into the mold cavity 27 of the mold assembly 24. The screw actuator 20 is actuated so as to drive the screw 18 forward toward the machine nozzle 22, toward the clamp assembly 25 (located on the left side of FIG. 7) along a load path of an injection force 304 that begins at the screw actuator 20 (located on the right side of FIG. 7). The injection force 304 is transmitted from the screw actuator 20 to the screw 18. In response to receiving the injection force 304, the screw 18 is driven toward the machine nozzle 22. In doing so, the screw 18 pushes against and moves the injectable molding material that is contained in the accumulation zone 217 into the machine nozzle 22 and into the mold cavity 27 of the mold assembly 24. However, part of the injectable molding material located in the accumulation zone 217 becomes pushed against the high pressure section 224 so as to urge the high pressure section 224, the second flange 112, the load ring 280 and the yoke 284 toward the clamp assembly 25. However, the high pressure section 224 is maintained in a static condition because the bolts 286 react by generating a reaction force 287 that is opposite but equal in magnitude to the force acting on the high pressure section 224.

Figure 8:
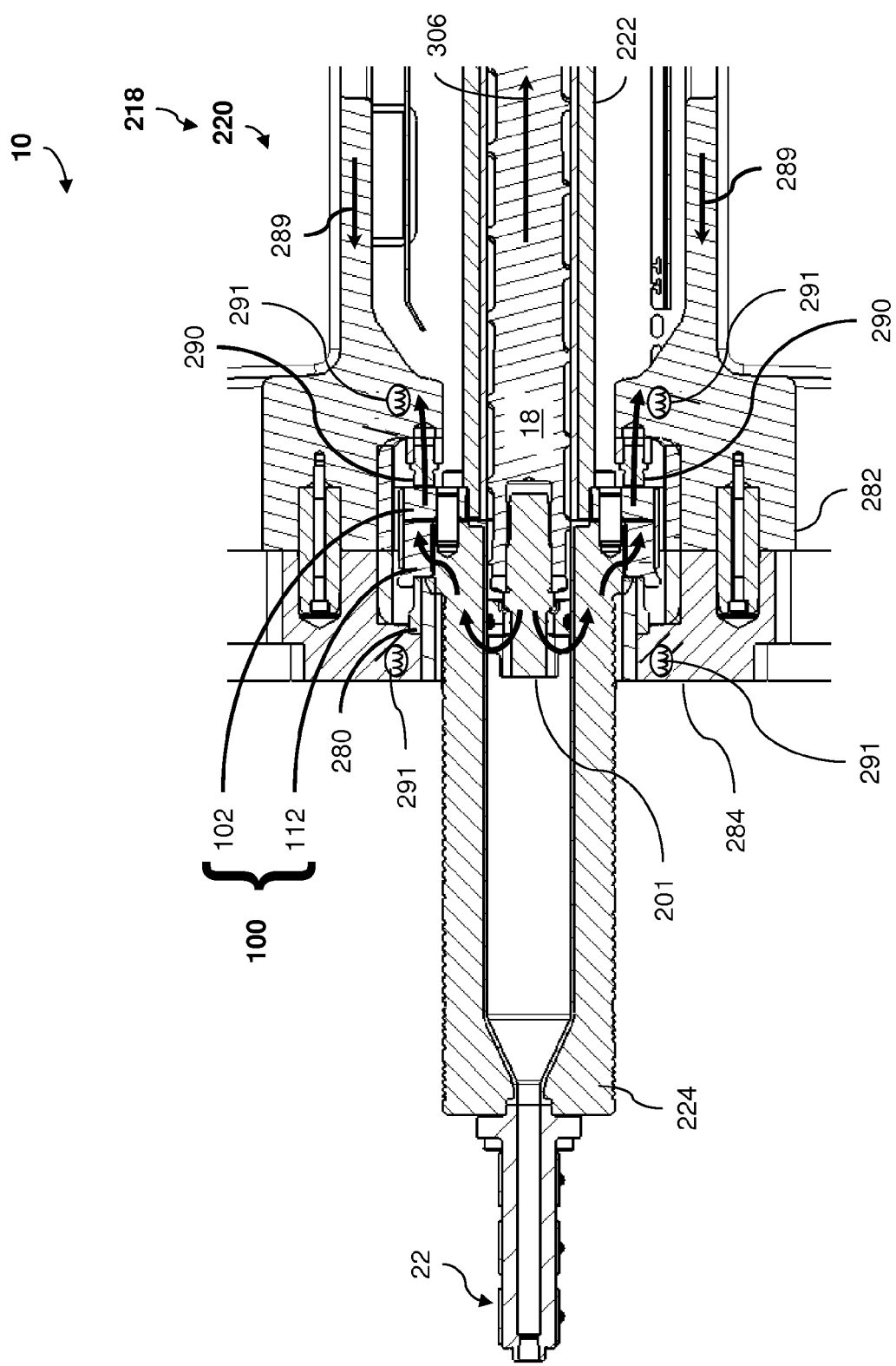
FIG. 8 depicts a cross sectional view of the molding system 10 of FIG. 1 according to the eighth exemplary embodiment.

FIG. 8 depicts the cross sectional view of the system 10 of FIG. 1 according to the eighth exemplary embodiment. Specifically, the screw 18 is depicted in a pull back cycle (sometimes referred to as a recovery cycle) of the system 10, in which the screw 18 is retracted or pulled back along a direction that extends away from the machine nozzle 22. The screw actuator 20 imposes or imparts a pull back force 306 to the screw 18. Since the valve 201 is attached to the distal end of the screw 18, the valve 201 is also pulled backward so that the valve 201 is made to drag along the inner diameter of the high pressure section 224; the pull back force 306 is imparted (transmittable) to the high pressure section 224, which is then transferred to the second flange 112, then to the first flange 102, then to the mechanical fuse assembly 290, and then to the injection housing 282. Since the injection housing 282 is attached to a stationary frame, the injection housing 282 will generate a reaction force 289 that is equal in magnitude to the pull back force 306 but acts in the opposite direction of the pull back force 306, so that in effect, the injection housing 282 remains stationary once the pull back force 306 is imposed to the screw 18. Under the presence of the pull back force 306, the mechanical fuse assembly 290 does not blow (that is, the mechanical fuse assembly 290 maintains its integrity and does not disintegrate). The mechanical fuse assembly 290 withstands the pull back force 306 as the screw 18 is driven backward under application of the pull back force 306.

Figure 9A:
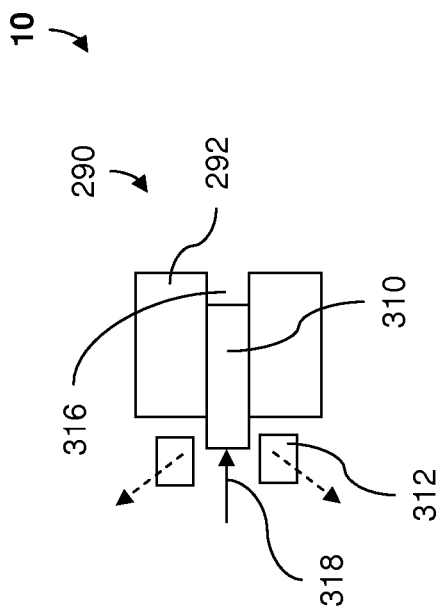
FIGS. 9A, 9B, 9C depict schematic representations of the molding system 10 of FIG. 1 according to the ninth exemplary embodiment.
Figure 9B:
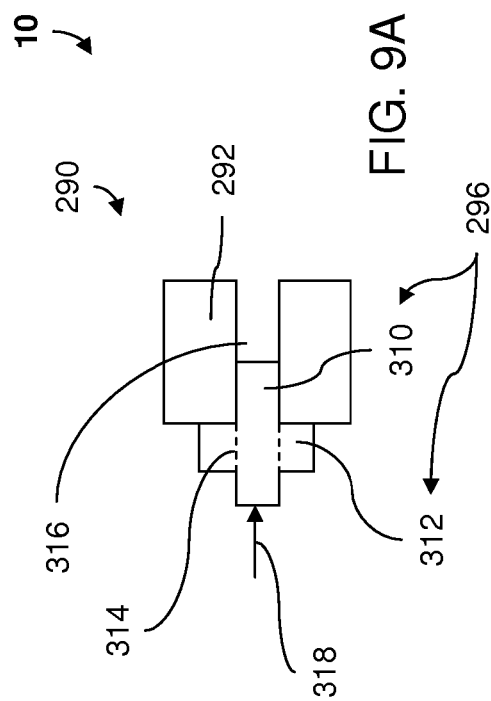
Figure 9C:
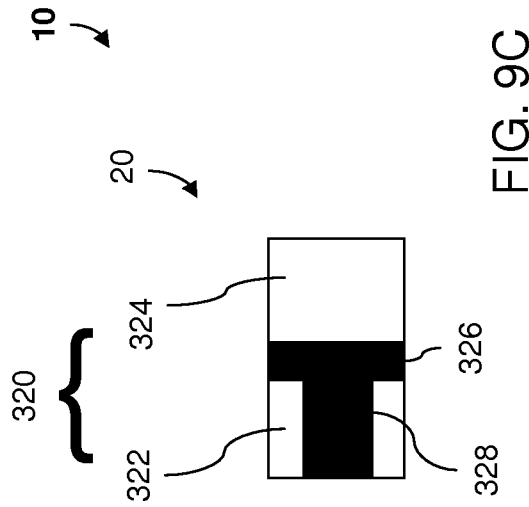

FIGS. 9A, 9B, 9C depict the schematic representations of the system 10 of FIG. 1 according to the ninth exemplary embodiment. FIGS. 9A and 9B depict the mechanical fuse assembly 290. The base unit 292 defines a channel 316 that extends from a front side to a back side of the base unit 292. The fuse element 296 includes: (i) a core body 310 that is sized to be slidably received, at least in part, in the channel 316, and (ii) a frangible part 312 that extends radially from a periphery of the core body 310. If the system 10 is used to mold a metallic molding material, the fuse element 296 is made of Stellite. The frangible part 312 is sized to be larger than the channel 316. In the presence of an applied force 318 that is applied to the core body 310, the frangible part 312 is designed to break away from (that is, shear from) the core body 310 along a break line 314 (the break line 314 defines the outer diameter of the core body 310 that is less than the diameter of the channel 316. As depicted in FIG. 9B, once the frangible part 312 is broken away from the core body 310, the core body 310 may slide along the channel 316 (under the influence of the applied force 318), and the frangible part 312 falls away from the core body 310. The core body 310 does not break from the frangible part 312 when the core body 310 (that is, the mechanical fuse assembly 290) receives the pull back force 306. The mechanical fuse assembly 290 may also be referred to as a shear pin. FIG. 9C depicts the screw actuator 20. The screw actuator 20 includes: (i) a cylinder 320 that has a bore side 324 and also has a rod side 322, (ii) a piston 326 that is slidable within the cylinder 320 between the bore side 324 and the rod side 322, and (iii) a rod 328 that is attached to the piston 326 and extends through the rod side 322 so as to connect to the screw 18.

Figure 10:
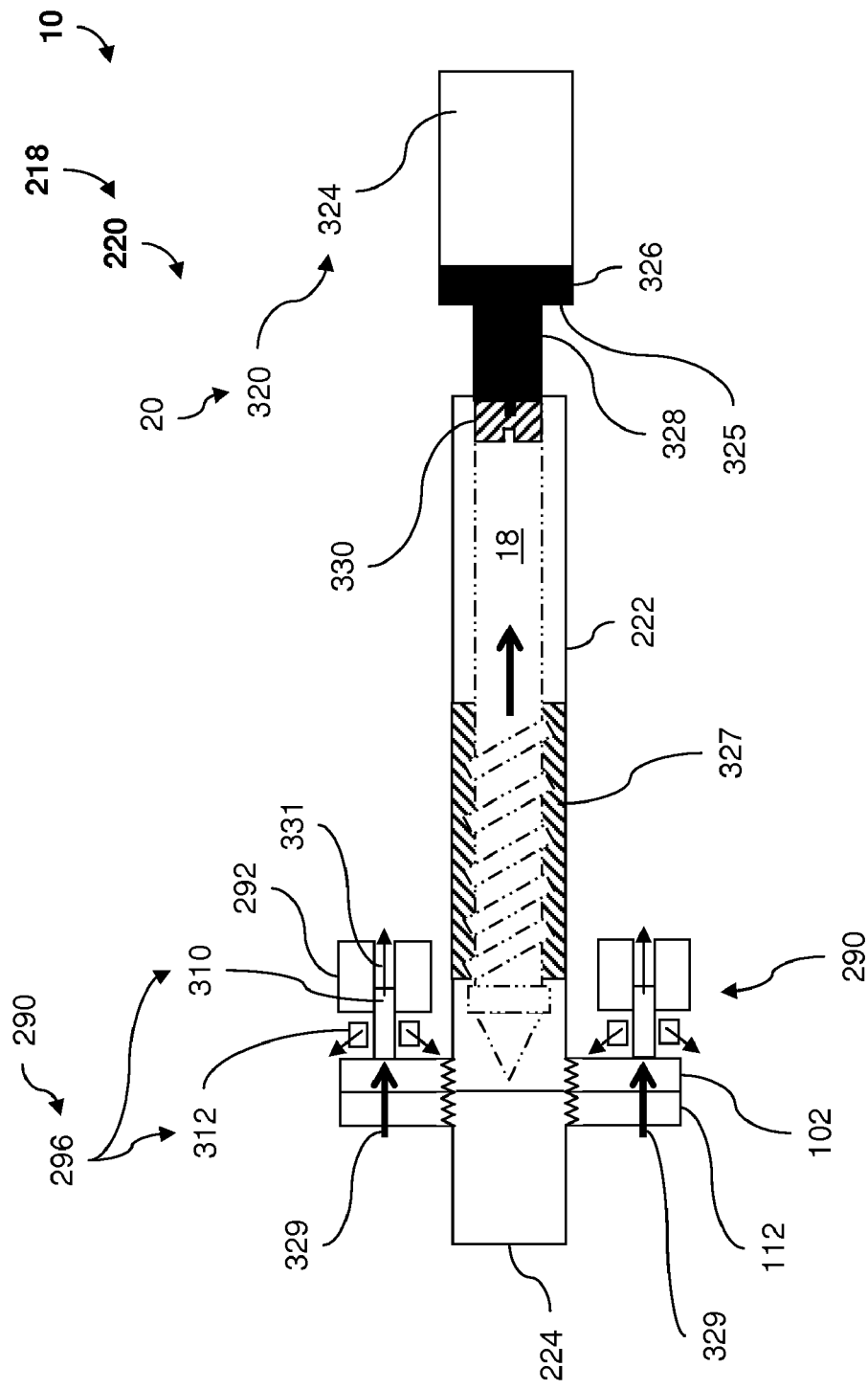
FIG. 10 depicts a schematic representation of the molding system 10 of FIG. 1 according to the tenth exemplary embodiment (which is the preferred embodiment or best mode).

FIG. 10 depicts the schematic representation of the system 10 of FIG. 1 according to the tenth exemplary embodiment. A fuse overload condition occurs when the force applied to the frangible part 312 becomes large enough to cause the frangible part 312 to shear from (detach from) the core body 310. The fuse overload condition exists when two events occur at same time: (i) the piston 326 has bottomed out against a bottom 325 of the rod side 322 (thus collapsing the rod side 322), and (ii) the screw 18 and the low pressure section 222 cool off enough so that the region that is located between the screw 18 and the low pressure section 222 becomes cooled off so that the injectable molding material that is located between the screw 18 and the low pressure section 222 becomes solidified into a solidified molding material 327 (in effect, the screw 18 becomes welded to the low pressure section 222); in turn, the screw 18 continues to cool off and shrink. Opposite ends of the screw 18 become pulled toward the solidified molding material 327. As a result, a screw connection 330 (that connects the screw 18 to the rod 328) experiences stresses that may inadvertently damage the screw connection 330 (that is damage between: (i) the rod 328 and the screw connection 330, and/or (ii) the screw connection 330 and the screw 18). The screw 18 contracts and thus imparts a contraction force 329 to the low pressure section 222, which is then transferred to the first flange 102 and then to the core body 310. Once the screw 18 shrinks beyond a predetermined amount, the contraction force 329 becomes large enough to cause the frangible part 312 to break away from the core body 310, and the contraction force 329 causes the core body 310 to travel into the channel 316 along a path 331. Once the core body 310 travels along the path 331, the screw 18 may continue shrinking and thus pull the low pressure section 222 toward the screw connection 330 without fear of causing inadvertent damage to the screw connection 330. The mechanical fuse assembly 290 provides thermal protection to the screw connection 330 when (i) the screw 18 becomes welded to the low pressure section 222 (as a result of cooling off), and (ii) the piston 326 becomes bottomed. The condition where the mechanical fuses 290 are expected to "blow" or yield (that is, become broken along the break line 314) is when the system 10 experiences an inadvertent shutdown condition, in which electrical power is shut off. In this case, the electrical heaters that are coupled to the barrel assembly 220 will no longer provide heat to the injectable molding material located in the sections 222, 224; and the injectable molding material will cool off so as to weld the screw 18 to the sections 222, 224. Power to the screw actuator 20 is shut down and the actuator 20 is bottomed out. As the screw 18 continues to cool off, the screw 18 will shrink. The mechanical fuse assembly 290 will permit the sections 222, 224 to move along with the screw 18 as the screw 18 continues to shrink due to loss of power to the heaters. In this manner, the screw connection 330 is saved from being damaged as a result of shrinkage of the screw 18 provided that the mechanical fuses 290 operate. Without the mechanical fuses 290, the screw connection 320 may suffer inadvertent damage as a result of the heaters of the sections 222, 224 loosing electrical power.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A molding system, comprising:
   an extruder, including:
      an injection housing;
      a barrel assembly being supported by the injection housing,
         the barrel assembly including:
            (i) a low pressure section being coupled to a feed throat of the extruder, and the low pressure section receiving, in use, a flowable molding material from the feed throat, the injection housing supporting, at least in part, the low pressure section; and
            (ii) a high pressure section being coupled to the low pressure section; and
         the injection housing including:
            (i) a load ring abutting the high pressure section;
            (ii) a yoke supporting, at least in part, the high pressure section, and the yoke being attached to the injection housing; and
            (iii) a yoke locating pin interacting with the yoke and the injection housing so as to align the yoke with the injection housing; and
      a mechanical fuse assembly being placed between:
   (i) the injection housing of the extruder, and (ii) the barrel assembly of the extruder, the mechanical fuse assembly being configured to permit movement of the barrel assembly, the mechanical fuse assembly being coupled to: (i) the injection housing, (ii) a first flange of the low pressure section,
      the mechanical fuse assembly including:
         a core body; and
         a frangible part being shearable from the core body, and under a fuse overload condition the frangible part being shearable wring from the core body, the fuse overload condition existing when: (i) a piston of a screw actuator becomes bottomed out against a bottom of a rod side of the screw actuator, and (ii) a screw that is attached to the screw actuator and the low pressure section becomes cooled off enough so that the screw becomes welded to the low pressure section, and the screw begins to shrink, and under presence of a pull back force, the mechanical fuse assembly remaining unblown.

\* \* \* \* \*